United States Patent
Vaeth et al.

(10) Patent No.: US 6,966,376 B2
(45) Date of Patent: Nov. 22, 2005

(54) METHOD AND COMPOSITION FOR DOWNHOLE CEMENTING

(75) Inventors: John F. Vaeth, Slidell, LA (US); Mark C. Duhon, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 44 days.

(21) Appl. No.: 10/249,307

(22) Filed: Mar. 28, 2003

(65) Prior Publication Data

US 2004/0188090 A1 Sep. 30, 2004

(51) Int. Cl.[7] .............................................. E21B 33/134
(52) U.S. Cl. ..................................... 166/286; 166/293
(58) Field of Search ............................. 166/135, 153, 166/156, 168, 177.4, 286, 292–295, 285, 287, 376; 106/820, 823

(56) References Cited

U.S. PATENT DOCUMENTS

| | | | | |
|---|---|---|---|---|
| 2,189,445 A | * | 2/1940 | Dale | 166/117 |
| 3,783,940 A | | 1/1974 | Urbanosky | 166/181 |
| 4,328,038 A | * | 5/1982 | Briggs | 106/642 |
| 4,452,637 A | * | 6/1984 | Suzukawa et al. | 106/735 |
| 4,767,460 A | | 8/1988 | Parcevaux | 106/90 |
| 5,346,012 A | * | 9/1994 | Heathman et al. | 166/293 |
| 5,942,031 A | * | 8/1999 | Cheung | 106/801 |
| 6,511,537 B1 | * | 1/2003 | Barlet-Gouedard et al. | 106/727 |
| 6,516,884 B1 | * | 2/2003 | Chatterji et al. | 166/294 |
| 6,668,928 B2 | * | 12/2003 | Brothers | 166/292 |
| 6,752,866 B2 | * | 6/2004 | Gonnon et al. | 106/727 |

OTHER PUBLICATIONS

E.B. Nelson and P. Drecq: "Latex–modified cement systems", *Well Cementing*, E.B. Nelson (editor), Houston, Texas, U.S.A, Schlumberger (1990), 7–6.

* cited by examiner

*Primary Examiner*—Zakiya Walker
(74) *Attorney, Agent, or Firm*—David Cate; Thomas O. Mitchell; Tim Curington

(57) ABSTRACT

Disclosed is a method to increase the bonding forces of a hydraulic cement to a subterranean pipe (such as a casing) by the addition of at least one cementitious expansive agent to increase the bulk volume of the cement plug and a latex. The method includes positioning a platform in a downhole pipe below the desired cement plug interval, positioning a plug dump bailer tool comprising a chamber for cement slurry and a valve to discharge the cement slurry on and above the platform, and discharging the cement slurry. The cement slurry includes an expansive agent and latex to increase the shear-bond between the downhole pipe and the cement plug.

20 Claims, 2 Drawing Sheets

METHOD AND COMPOSITION FOR DOWNHOLE CEMENTING

BACKGROUND OF INVENTION

The present invention relates to a method for downhole cementing, and more particularly, to a method for forming a pressure resistant seal using hydraulic cement to enhance the sealing properties of said cement, using a dump-bailer apparatus to convey the sealing cement slurry through the wellbore tubulars and displace the slurry at the proper depth.

It is well known by those practiced in the art of oil well drilling and completion technology to use hydraulic cement for various operations such as pressure isolation between reservoirs, mechanical support of casing and liners, prevention of lost fluid circulation to abnormally pressured reservoirs, and pressure isolation inside the well tubular and annular spaces. During the abandonment of reservoirs after the hydrocarbons have been removed, hydraulic cement is required to create a permanent and impermeable barrier, to prevent contamination of adjacent reservoirs, subterranean fresh-water aquifers, and surface waters.

The hydraulic cement slurry can be placed into the well by a plurality of devices; the scope of this invention refers to placement by means of dump bailer method and operations. This method typically involves a wireline or slickline tool used to place small volume of cement slurry, or similar material in a wellbore. Typically, the slurry is placed on a plug or similar device that provides a stable platform for the volume of cement plug. A dump-bailer tool includes a tubular chamber for storing the cement slurry and a ported valve for the slurry to discharge from the dump-bailer into the subterranean wellbore. The methods and devices of dump-bailer operations are well known to those practiced in the art and for instance from the U.S. Pat. No. 3,783,940.

Since the dump-bailer tool is typically used on completed wells, the diameter of the tubular chamber is reduced for the tool to be run through a production tubing. Moreover, the tool length is limited to the about 50 feet like for most wireline equipments and consequently, the volume of the cement slurry chamber does not exceed several gallons. On the other hand, the volume of the cement plug to be placed is typically 5 to 10 times greater, meaning that numerous runs are required, each involving retrieving the dump-bailer tool back to the surface and reloading it with a new cement slurry load. As a result, a plug placement may require two to three days.

To increase time efficiency, it would be suitable to reduce the required volume of a cement plug, thereby reducing the number conveyance trips of the dump-bailed cement slurry.

The purpose of placing a cement plug is to form a solid monolithic barrier that develops very low permeability to axial fluid migration and forms a permanent bonding force to the interior diametrical surface of the casing. This bonding force shall create a resistance force greater than the effects of subsequent hydraulic or mechanical forces acting on the cross-section or surface contact area of the plug and is equal to the product of the bonding surface to the bonding force per surface unit. Therefore, to increase the bonding surface, either the height of the plug (and consequently its volume) or the quality of the bonding has to be increased. Hence, improving the quality of the bonding surface would reduce the requirement of numerous conveyance trips.

SUMMARY OF INVENTION

A first aspect of the present invention is a method to increase the bonding forces of a hydraulic cement to a subterranean pipe (such as a casing) by the addition of at least one cementitious expansive agent to increase the bulk volume of the cement plug and a latex. In other words, the invention relates to a method of forming a cement plug in a downhole pipe comprising positioning a platform in a downhole pipe below the desired cement plug interval, positioning a plug dump bailer tool comprising a tubular storing chamber for a cement slurry and a valve to discharge the cement slurry on and above the platform and discharging a cement slurry that comprises an expansive agent and a latex in quantities enough to increase the shear-bond between the downhole pipe and the cement plug.

Lattices are emulsion polymers where the solid polymer typically in quantity of about 50%—is supplied as a suspension of very small particles (usually from about 200 to about 500 stabilized by surfactants. Commercial lattices are prepared from a variety of polymers including vinyl acetate, vinyl chloride, acrylics, acrylonitrile, ethylene, styrene, butadiene. Lattices especially styrene-butadiene latex systems are of common use in well cement technology for the prevention of annular gas migration and to better bond oil-wet surfaces (such as the formation) and water-wet surfaces (the cement). Reference is made for instance to E. B. Nelson and P. Drecq: "Latex-modified cement systems", *Well Cementing*, E. B. Nelson (editor), Houston, Tex., U.S.A, Schlumberger (1990), 7–6.

In practice, concentration of at least 2 gps (gallons per sack of cement; 1 gps is 1 gallon per 94 pounds of cement) are used for preventing annular gas migration and about half concentration are used for improving bond. Surprisingly, the authors of the present invention have found that far reduced concentration of lattices can be used for improving the shear-bond with the casing. For instance, where the latex comprises a styrene-butadiene system as disclosed in U.S. Pat. No. 4,767,460, concentrations in the range of about 0.05 to about 1 gps improve the shear-bond, best results with concentrations in the range of about 0.1 to about 0.5 gps.

Various expansive well systems are known that either rely upon the formation of ettrringite, the crystallization of added salts, or the use of metallic (zinc, magnesium, iron or aluminum powder) or metallic oxide compounds. According to a preferred embodiment of the present invention, calcined magnesium oxide is used, preferably in the range of 5 to 10% by weight of cement.

According to a variant of the present invention, the expansive agent is a metal agent used to initiate an active electrochemical reaction with the pipe, described as galvanic corrosion under the environmental conditions of the subterranean wellbore.

Casing, and the majority of steel tubular products used in subterranean wellbores consist of carbon alloy steels. During the manufacturing process, and in air or water environment, iron oxide scale is produced on the pipe surface usually not protected with a varnish coating. By adding a dissimilar metal as an additive to the cement, it is possible to induce a galvanic corrosion using the aqueous phase of the cement slurry as electrolyte to form new oxides that increase the diametric bulk volume of the cement plug and cause a corresponding increase of bonding force from the cement plug. In addition, the galvanic corrosion makes the internal surface of the pipe rougher and therefore the quality of the bond is further improved.

The above and further objects, features and advantages of the present invention will be better understood by reference to the appended detailed description and drawings.

DETAILED DESCRIPTION

A primary use of well cementing is to isolate different pressure regimes and fluid flows in the annular space between two concentric tubular strings, and also in the annular space between the outermost casing and the drilled wellbore. Cured cements also have the mechanical strength to support casing and tubular members. Well cementing may also be used inside a wellbore tubular pipe to form a permanent barrier (isolation) plug in the well completion hardware. In this later case, the cement plug is often not pumped from the surface but deliver at the proper depth in the wellbore using the dump-bailer method.

Figure 1:
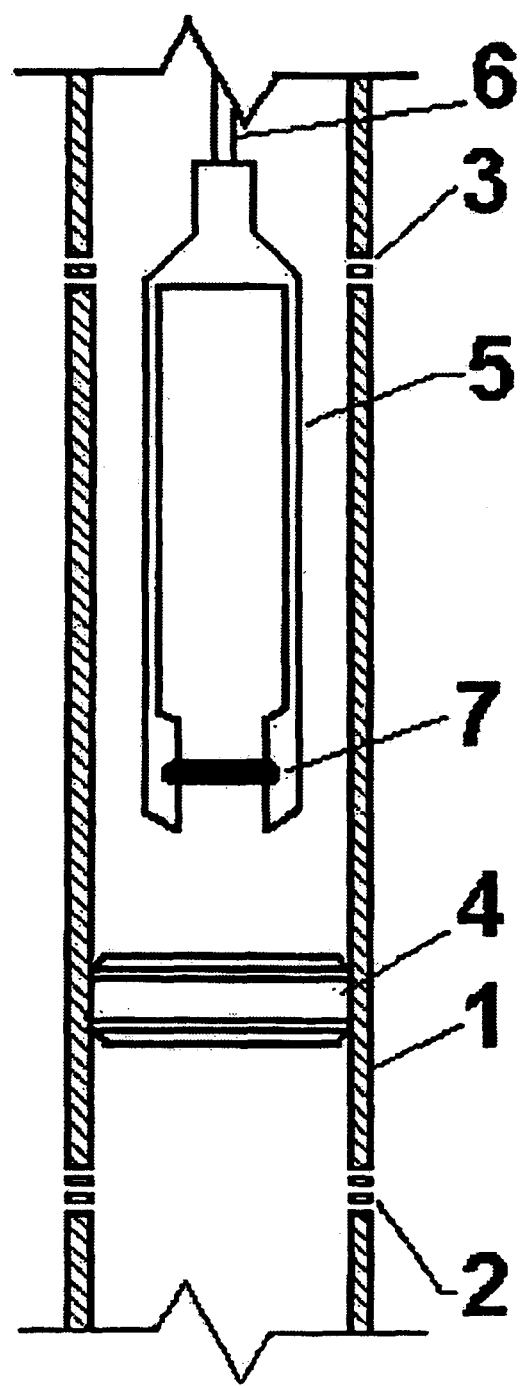
FIG. 1 is a schematic illustration of the dump-bailer method.

Referring to the drawings, FIG. 1 illustrates the apparatus for emplacing a cement plug in a wellbore penetrating a subterranean formation. As illustrated the wellbore contains a casing 1. The casing may be held in place through a cemented annular bridging the outside surface of the casing and the wellbore walls here not represented for clarity purpose.

To create a fluid communication between the interior of the casing and the surrounding formation, perforations are provided as illustrated in 2. Along time, the boundaries between oil-producing formation areas and not-producing (or worth water-producing) often change making suitable to perforate in a new area as shown in 3 and to prevent any further production from the former perforations 2. To that purpose, a plug can be placed in the pipe, betweens the two series of perforations, at a level determined by first positioning a platform, for instance such as the bridge plug 4.

Dump-bailer tools are well known and therefore will not be described in length herein. It is sufficient to note that they essentially include of a thin wall concentric fluid chamber 5 consisting of threaded bailer tube sections. The upper end of the tubes is connected mechanically to an armored or solid cable 6 that is spooled on a surface winch. The lower end of the tool consists of electrical and/or mechanical dump release mechanisms 7, for instance a bull-plug which supports and confines the cement slurry during conveyance into the wellbore. The bull-plug consists of a valve device or rupture plug, which is initiated at the proper dump depth by human interface; either electrically, hydraulically, or mechanically initiated.

The dump bailer method expels the cement slurry at the bridge plug 4 or other barrier device in the well. The slurry volume capacity of the dump-bailer device is limited by the length and internal diameter of the bailer tubes. Typical dump-bailer volumetric capacities range from one to six imperial gallons. After each dump of slurry, the dump bailer is retrieved to the surface and prepared for subsequent dump-bail operations.

The cement plug is placed between two perforated areas. Therefore, it is subject to top and bottom pressures that tend to either lower the plug towards the bottomhole or to raise it be equal or larger than the maximum axial stresses applied to the cement plug. It is assumed the maximum applied stress will normally be in the form of a differential hydraulic pressure, acting on the top or bottom circular cross-section of the plug.

The force on the plug F is determined the plug cross-section area multiplied by the difference between the pressures exerted on the top and bottom faces of the plug (the differential pressure $\Delta P$) as described by the following equation 1:

$$F = \Delta P \times \pi/4 \times \Theta i^2 \qquad \text{Equation (1)}$$

where $\Delta P$ is the differential pressure and $\Theta i$ is the internal diameter of the casing pipe.

In most cases, the cement strength is considerably higher than the force on plug. The most prevalent failure occurs at the interface between the casing pipe and the cement plug, with either a partial or total failure of the established interfacial bonds at the cement boundary layer. After these circumferential bond forces have been established in the cured plug body, subsequent axial stresses and pressure changes acting on the plug body can yield some locations or the totality of locations of the established circumferential bond forces. Axial stresses can be in the form of 1) mechanical shocks or vibrations to the cement barrier plug, 2) fluid pressures different from the pressure regime applied to the cement plug during the cure process, henceforth described as differential pressure, 3) migration of differential pressure through the body or external micro-annulus cracks of the cement plug, causing a outward pressure acting on the casing hoop, which in turn creates an expansion of the casing, 4) migration of differential pressure through the body or external micro annulus of the cement plug, causing a inward pressure acting on the cement plug body, which in turn creates an contraction of the cement plug diameter. The process of overcoming the established circumferential bond forces by any of the means described above creates a failure from bond slippage or bond separation, the results of the failure described as undesirable movement of the plug body or undesirable migration of fluids through the plug body, i.e. a pressure leak.

Mathematically, this bond force B can be expressed by the equation (2);

$$B = \pi \times \Theta i \times H \times ESBS \qquad \text{Equation (2)}$$

where H is the height of the cement plug, $\Theta i$ is the internal diameter of the casing pipe and ESBS is the effective shear bond strength per unit area.

To avoid any movement of cement plug, the bond force must be at least equal to the force on plug, which translates into equation (3):

$$H > \Delta P \times \Theta i / 4 \times 1 / ESBS \qquad \text{Equation (3)}$$

Equation 3 shows that the magnitude of both the required plug length (H) and the required cement slurry volume ($H^* \pi/4 * D^2$) of a cured cement barrier plug is directly proportional to the magnitude of effective shear bond strength (ESBS) of the cement barrier plug, with the other conditions remaining constant.

If the ESBS of a cured cement plug can be increased through chemical interactions between cement slurry components, electrochemical corrosive processes between slurry components and the well fluids, electrochemical corrosive processes between slurry components and the well tubular wall surfaces, or chemo-mechanical expansive processes from interaction of slurry components, these processes occurring prior to the application of external applied stresses, the effective result will be a cement barrier plug having less length (H) able to resist the applied stresses, when compared to other plugs with proportionally less ESBS.

The ESBS of hydraulic cement barrier plug is time-dependent, since the active chemical processes within the cement structure have been physically measured at time periods of days and months. Knowing this is the case standard time periods have been designated as benchmarks for measurement of cement physical properties. The present invention describes barrier plugs designed for oilfield operations, which standardize on the 24-hour time interval. At the 24-hour elapsed time after the cement is properly placed in an oilfield operation, the physical cement properties can be measured and compared to other cement specimens at the same benchmark time. At the 24-hour benchmark, typically 90 percent of the cement chemical reactions have occurred, and the remaining reactions would occur at a much slower rate. Nevertheless, the effect of time on the hydraulic cement chemical processes is normally complementary to the magnitudes of ESBS and other measurable cement parameters, and more elapsed cure time benefits the effects of expansion agents and corrosive processes, the cumulative effect of each would produce a higher ESBS when this parameter is measured at later elapsed time intervals.

Figure 2:
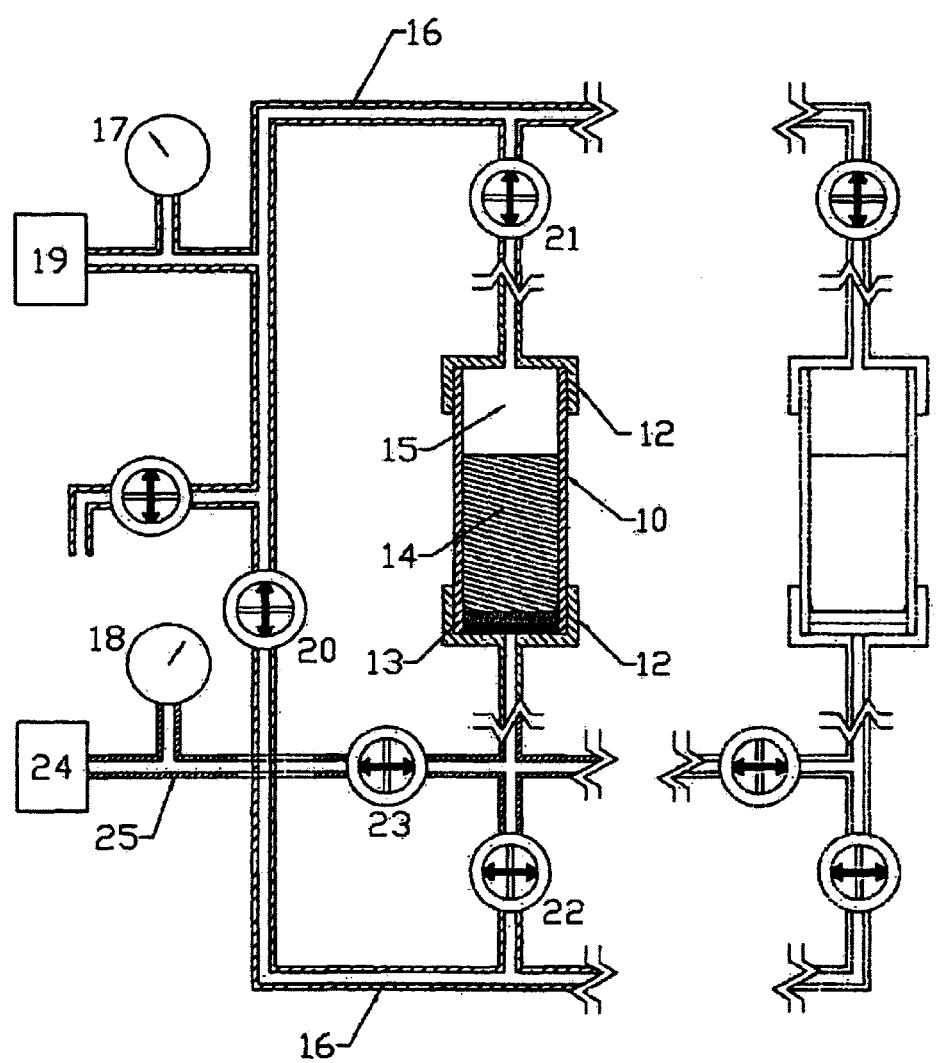
FIG. 2 is a diagram of the testing apparatus used for comparing the shear-bond of different cement plugs.

The quantitative physical measurement of ESBS of a hydraulic cement barrier plug can be simulated in a laboratory environment, as illustrated FIG. 2.

The cement plug shear bond test apparatus consists of six separate sample test vessels 10. The vessels are all enclosed within a convection-type temperature regulated oven that is programmed to control the vessel temperature to a regulated set point. The temperature versus time profile of the oven simulates the temperature of the subterranean well bore environment the cement slurry is exposed to as it sets and cures with time. Temperature regulation is important to test results as the cement slurried and set properties are influenced by the reaction temperature.

Each sample test vessel 10 has a overall length of 6.00 inches and a nominal diameter of 1.000 inches. The sample test vessel 10 external surfaces are machined to accept end plugs 11, 12 that are threaded and pressure sealed using elastomer seals. These machined features and end plugs 11, 12 are required to keep the sample test vessel 10 from leaking hydraulic fluids and pressure during the test. Each sample test vessel 10 has a moving piston 13 placed at the lower end of the vessel 10. After the piston 13 is placed at the lower end of the sample test 10, a volume of test slurry cement 14 is poured into the sample test 10 to occupy the volume above the dynamic piston 13. The liquid cement slurry 14 conforms to the internal dimensions of the sample test vessel 10. Adequate cement volume is poured to create a sample test plug of cured cement with a dimension of 4.0 inches (10.16 cm) and a diameter of 1.0 inch (2.54 cm). After the cement 14 is placed in the vessel 10, the balance of the vessel is filled with water 15.

The end caps 11,12 also are supplied with hydraulic connections to hydraulic fluid piping 16. The hydraulic fluid piping 16 is connected to both the upper and lower end plugs 12 of each vessel 10. All hydraulic piping 16 for the six vessels 10 are routed to a control panel. The hydraulic fluid within the hydraulic piping 16 is potable water. At the control manifold the test operator has the ability to control and monitor the hydraulic pressures being applied to both the upper and lower end of a sample test vessels 10. Hydraulic pressure is monitored by pressure gauges 17 and 18. For the duration of the cement 14 cure time period a constant hydraulic pressure is applied to the upper and lower ends of each sample test vessel 10 by a hydraulic pump 19 as the slurried cement 14 sets and cures. This equalized pressure is applied to the slurried cement 14 in each sample test vessel 10 by equalizing valve 20 open from the upper end and lower end of hydraulic piping 16 on all test vessels 10. During the cement 14 cure-time the top hydraulic valve 21 and bottom hydraulic valve 22 are also opened to keep pressures equalized in each sample test vessel 10. The pressure from hydraulic pump 19 applied to the hydraulic piping 16 during the test is a simulation of the applied hydraulic pressures applied to a slurried cement deposited in a subterranean well bore environment.

The vessel 10 is placed in an oven and temperature is regulated to a defined cure temperature for a 24-hour time period. During this time period the cement 14 sets and cures to a strong solid cement 14 plug that has developed a surface contact bond force to sample test vessel 10 internal cylindrical wall. The surface contact area of the cured cement 14 plug to the vessel 10 is defined as the area equal to cement 14 plug circumference ($\pi$*diameter) multiplied by cement 14 plug length. The piston 13 contacting the cement 14 plug's lower cross-section is dynamic and when differential pressure is applied to this piston 13 it creates a force on the cured cement 14 plug specimen per the pressure equation F=(P below−P above)×A×s. This equation is defined as the hydraulic force on the cement plug is equal to differential pressure multiplied by $\pi$ multiplied by the square of cement plug diameter; with test cement 14 plug diameter=1.000 inch, cement 14 plug height=4.0 inch. The direct measurement of the hydraulic pressure or force on the cement 14 plug is a requirement for the calculation of cement plug "effective shear bond strength" (ESBS).

Each sample test vessel 10 is a heavy walled cylindrical vessel fabricated from alloy steel. The inner surface of sample test vessel 10 is machined to a smooth surface finish. The inner surface is then coated with a hard, durable, and corrosion resistant chrome plating. The vessel 10 chrome plated surfaces are then mechanically honed, polished, and lapped to very tight dimensional tolerances for straightness, circularity, cylindricity, and surface finish. The description of the sample test vessel 10 internal surface would be described as a perfectly straight, perfectly round, and perfectly smooth cylinder.

The described internal surface of the sample test vessel 10 is in direct contact with the cement 14 slurry during the test process. As the cement 14 sets and cures during the test the cylindrical outer surfaces of the slurried cement 14 contact and bond to the vessel 10 surface. The bond forces created during the described test are indicative of the bond force the cement 14 slurry would apply to a specimen of oil field tubular pipe, if the cement 14 was slurried and deposited into the internal annulus of the oil field tubular pipe in a subterranean well bore and allowed time to cure to a hard cement plug.

After a prescribed time interval, typically 24 hours after the slurried cement 14 is placed into the test oven, the cement 14 plug has developed enough mechanical strength and bonding to the vessel 10 wall to be tested for plug shear bond strength. The shear bond test pump-out procedure is performed at the prescribed test time, at in-situ thermal conditions inside the thermal oven, to prevent errors to test results. These errors can be introduced by removing the sample test vessel 10 from the thermal oven environment to ambient conditions. The steel sample test vessel 10 and the cement 14 plug have differing coefficients of thermal expansion/contraction, and the removal of samples from thermal test conditions would generate unacceptable stresses in the test cement 14 plug samples during cooling to room temperature.

The pump-out procedure is performed by closing equalizing valve 20 and bottom hydraulic valve 22 and opening top hydraulic valve 21 and pump-out hydraulic valve 23. The pump-out hydraulic pressure is applied to the dynamic piston 13 at the lower end of sample test vessel 10 by a hydraulic pump 24 pumping hydraulic fluid into pump-out hydraulic line 25 and through the opened pump-out hydraulic valve 23. The pump-out pressure is monitored by a pressure-sensing device 18.

At the conclusion of the test a differential pressure and force will be exerted on the initial cement 14 plug body by the application of additional pressure from below the sample test vessel 10, applying more pressure to the dynamic piston 13 at the lower end of the sample test vessel 10. The applied pressure on the piston 13 is increased until the cement 14 test plug has failed by moving, noted by a drop in the applied pressure to the piston 13, as seen on pressure sensing device 18. The difference in pressures between the lower end dynamic piston 13 and the upper end pressure from pressure sensing device 17 is the Delta Pressure at failure (P below–P above). The "Effective Shear Bond Strength" (ESBS) per unit contact area of the cement 14 plug sample can now be determined by the balanced equation derived for the cement 14 plug failure pressure:

Hydraulic Force on Plug=Resistant Force of Bonded Plug

Delta Pressure on Plug×Plug$_{XS}$Area=Plug to Vessel Contact Area× Cement Plug ESBS ($P$ below $P$ above)×($\pi$/4×plug diameter2)×($\pi$×plug diameter×plug height)×Cement Plug ESBS Cement Plug ESBS (lb/sq.in)=($P$ below $P$ above)*(plug diameter/ 4)/plug height An example of the shear bond for a typical cement plug in the mentioned equation is shown below, assuming $P_{below}$= 4000 psi, $P_{above}$=3000 psi $\pi$=3.14, plug diameter=1.000 inch, and plug height=4.0 inch; the Cement Plug Effective Shear Bond Strength (ESBS) is equal to 62.5 lb/sq. in.

The test method for this apparatus performs the same pump-out procedure to the six sample test vessels 10. The test results for Cement Plug ESBS from these samples are calculated for averaged results and standard deviation.

Upon the conclusion of a shear bond test for a selected cement slurry, the Cement Plug ESBS can be used during actual cement plug design to formulate the correct cement plug length with actual well bore tubulars. For example, to design the plug height; all other variables known.

Plug heigh =($P$ higher $P$lower)×plug diameter/4×Cement Plug ESBS

An example of the plug height requirement for a typical cement plug in a typical oilfield tubular casing (7" 32 lb/ft) is shown below assuming P high pressure reservoir=6050 psi, P low pressure reservoir=4000 psi, plug diameter=6.10 inch and Cement Plug ESBS=62.5 lb/sq.in; a minimum height of 50 inches is required for the plug.

The cement plug shear bond strength test described above enables the comparative testing of different slurried cement formulations to determine the optimum cement recipe, in essence the formulation which has the maximum tested values of Effective Shear Bond Strength (ESBS). Using an optimized slurried cement with a well-defined cement plug Effective Shear Bond Strength (ESBS) in a subterranean well bore would allow the minimum volumes of cement slurry. In situations when the well completion only allows for the conveyance of small volumes of cement slurry for each wire line descent, the slurried cements optimized for shear bond strength would require less descents (less plug height) to create a viable cement plug.

The cement 14 cures for a 24-hour period in an autoclave vessel where both the cement cure temperature and pressure are regulated and measured to simulate well environment. At the conclusion of the 24-hours, the cured cement 14 plug is axially stressed to a contact-slip failure, by either a measured differential pressure applied on the plug, or alternatively a measured mechanical force pressing on the plug from one end of the sample test vessel 10. The ESBS (per square inch of contact area) of the cement plug can be calculated by the equation (4):

ESBS=measured force/cement-to-vessel contact area    Equation (4)

Both equation (4) and the laboratory simulation procedure described above provide a good approximation of the in-situ cement plug strength in an oilfield well casing. However, it is apparent to those practiced in the art of designing and creating cement barrier plugs the plug's ESBS, as determined under laboratory conditions, can not typically be correlated to in-situ well conditions without introducing engineering safety factors or coefficients. The known environmental factors which detrimentally influence in-situ plug ESBS are 1) contamination of the cement slurry medium and additives as it interacts with miscible well fluids, 2) dilution and subsequent free-water adsorption of the cement slurry medium as it interacts with miscible well fluids, 3) interaction of the cement slurry medium with volatile organic compounds, especially hydrocarbons, 4) imperfect contact of the cement boundary to the casing 1 surface in unbonded areas, where the cement is prevented from intimately infiltrating the casing mill-scale surfaces by surface films and surface scales, said scales either ferrous or non-ferrous and 5) indeterminate condition of the casing 1 interior surface finish.

The variability of oilfield tubulars interior surface finishes in well environments introduces a significant and unknown error as the failure mode of the in-situ cement barrier plug bonded to the casing is highly influenced by the surface finish. Deviations and disconformities in the surface create a condition of a shear-slip failure of the cement, rather than a contact-slip failure as simulated in the lab. The former condition introduces a large error factor but it is assumed that the polished testing vessel is actually less favorable to the quality of the bond, in other words, the testing equipment probably provides a conservative value of the actual shear bond.

Hydraulic cement is described as a mixture of Portland cement, water, chemical agents and additives to enhance rheology and ultimate cured strength, slurry-set retardant to regulate slurry stage time interval, and a plurality of additives for fluid loss, deflocculation and dispersion, and for prevention of gravity settling of cement solids.

The addition of expanding additives to the hydraulic cement slurry can cause the volumetric, diametrical, and linear expansion of oil well cements. The diametrical expansion of the curing cement creates hoop stresses to the interior diametrical surface of the wellbore tubular. These hoop stresses exerted on the tubular surface increases the magnitude of the bonding strength of the cement plug to the tubular. The net effect is to increase the per unit shear bonding strength ESBS of the cement to the circumferential area of the tubular.

According to a preferred embodiment of the present invention, said linear expansion of the cured cement is obtained through the addition of calcined magnesium oxide, also known as periclase, which reacts with water to form a volumetrically expansive reaction product of magnesium hydroxide, $Mg(OH)_2$, also known as brucite. The reaction to hydroxide creates a volumetrically expansive product, which potentially increases the ESBS of the barrier plug.

Adding about 8% (by weight of cement) provides a significant threefold improvement of the ESBS, (from about 25 psi (0.17 MPa) to about 75 psi (0.52 MPa), however not enough to authorize a similar reduction of the plug height bearing in mind the difficulty to scale-up the test results.

However, if the slurry further comprises a latex in relatively small quantity, indeed in a quantity about one-tenth of the quantity ordinarily recommended for well cement applications, it was found that the ESBS increase is about tenfold.

According to another embodiment of the present invention, an admixture is used to induce a galvanic reaction that creates expansive electrochemical ferrous reaction products, thereby increasing the intrinsic ESBS of the barrier plug.

The majority of steel tubular products used in subterranean wellbores consist of processed carbon-alloy steel casings, carbon-alloy steel liners, and carbon-alloy steel tubulars and pipes. Ordinary processed carbon-alloy steels are essentially alloys of iron and carbon with small additions of elements such as manganese and silicon added to provide for the required mechanical properties. Steels in general and steel tubulars in particular are manufactured from a mixture of pig iron and scrap metals, which is treated in the molten state to remove excess carbon and other impurities. The steel may be continuously cast into strands or cast into individual ingots. The final tubular product is then produced by extrusion drawing and rolling. During this process the steel surfaces are oxidized by air and an iron oxide scale is produced, usually termed mill scale. In air, the presence of mill scale on the steel surface may reduce the corrosion rate over short periods, but over longer periods the corrosion rate tends to rise. In water environments, severe pitting of the steel may occur if large amounts of mill scale are present on the surface of the steel. The exterior exposed surfaces of steel tubular products typically receive a protective coating of varnish for transport and storage, but the interior surface does not typically receive the varnish protection. The iron oxide mill scale on the interior surface of the wellbore tubular is the particularly relevant steel material which would mechanically, chemically, or electro-chemically react and bond to the cement slurry, its final cement barrier plug form, or to any admixtures present in the cement slurry or plug.

Galvanic bimetallic corrosion refers to corrosion reactions induced when two dissimilar materials are reacting with each other in a corrosive electrolyte bath. It occurs when two or more adjacent and dissimilar metals of different chemical nobility are placed in an electrically conductive electrolyte medium under water. When the galvanic corrosion reaction forms, one of the admixture metals in the cement slurry becomes the anode and corrodes faster than it would alone, while the other becomes the cathode and corrodes slower than it would alone. Either or both metal in the reaction may or may not corrode by itself in the wellbore environment. When the reaction with a dissimilar metal is made, however, the self-corrosion rates will change. During the galvanic corrosion reaction the powdered iron material (anodic) admixed in the saline slurry converts it into a more chemically stable iron oxide. The volumetric change during the phase change of the iron to an iron oxide material is positive, and exhibits structural growth.

Galvanic corrosion can be achieved for instance by adding 1–20% by weight, based on the weight of cement, of an actively cathodic metal, and 1–20% by weight, based on the weight of cement of an actively anodic metal, both in the physical form of ground powders or small particles capable of being admixed and suspended in the cement slurry. The cathodic metal is described as having a high chemical nobility, and purposefully chosen to initiate a electro-chemical galvanic reaction when reacting to a dissimilar and more anodic material. For purposes of illustration a suitable material for this application is graphite powder, carbon black, or similar type carbon material. The anodic is described as having a lower chemical nobility and additionally, should be purposefully chosen to have similar anodic properties to the oilfield tubular material comprising the in-situ subterranean wellbore casing or tubular goods. For purposes of illustration a suitable material for this application is iron reagent powder, which can create volumetrically expansive iron-oxide reaction products as a result of the galvanic reaction.

To be noted that the cement composition useful for the method according to the invention will typically further include standard additives such as dispersing agents, anti-settling agents, set-retarder or set-accelerators, as it is the common practice of the art.

EXAMPLES

The following tests were performed using a base slurry composition consisting of 720 g Portland cement, Lone Star Class H 252 g silica flour; 35% by weight of cement (BWOC)

2.20 g of a dry dispersing agent, based on sodium polynapthalene sulfonate 1.44 g of an anti-settling agent based on crystalline silica and a biopolymer 1.13 g of a set retarder, based on calcium glucoheptonate 290 cc of low-salinity fresh water (28% BWOC)

To the above listed compounds, two admixtures are preferably added according to invention:

1–10% by weight, based on the weight of cement, of a dehydrated and calcined magnesium oxide (MgO);

0.02 to 1.0 gps of a latex solution with a solid content of about 50%.

The ingredients are mixed by first stirring the water at 400 rpm, then in the following order, slowly adding the latex, the retarder, the dispersing agent, the silica flour added and mixed until hydrated, the cement added and mixed until hydrated, magnesium oxide added and mixed until hydrated. After all admixtures have been hydrated the slurried composition is mixed at high speed (600 rpm) for 20 minutes and then at low speed (150 rpm) for 5 minutes. Six samples of the cement slurry are then placed into the shear bond sample test oven for a 24-hour cure period at a specified cure temperature and pressure. At the conclusion of this time all samples are pumped out to failure with hydraulic pressure to determine "delta pressure" of each sample. All six samples are measured for diameter and length. ESBS is calculated for each sample, the six sample ESBS results averaged in the table below.

Results are provided in table I below:

| [Table Heading] | | | |
|---|---|---|---|
| Test # | Latex (gps) | MgO (% BWOC) | Shear Bond (ESBS) (psi [MPa]) |
| 1 | 0 | 0 | 78 [0.54] |
| 2 | 0.07 | 8 | 412 [2.84] |
| 3 | 0.14 | 8 | 391 [2.70] |
| 4 | 0.28 | 8 | 282 [1.94] |

-continued

| Test # | Latex (gps) | MgO (% BWOC) | Shear Bond (ESBS) (psi [MPa]) |
|---|---|---|---|
| 5 | 0.63 | 8 | 244 [1.68] |
| 6 | 1 | 8 | 191 [1.32] |
| 7 | 1.6 | 8 | 28 [0.19] |

The above tests show that shear bond higher than about 250 psi (1.7 MPa) can be achieved using the method according to the invention, therefore making it possible to significantly reduce the height of the cement plug.

The test #4 was repeated, but this time the cement was contaminated. An average shear bond of 260 psi was obtained. This test is another success as the shear bond of the contaminated samples averaged 88% of the shear bond of the clean samples. Samples averaged 88% the shear bond of the clean samples.

What is claimed is:

1. A method of forming a cement plug in a downhole pipe comprising:
   positioning a platform in the downhole pipe below the desired cement plug interval;
   positioning a plug dump bailer tool comprising a tubular storing chamber for a cement slurry and a valve to discharge the cement slurry on and above the platform;
   discharging the cement slurry, whereby said cement slurry comprises an expansive agent and a latex incorporated in a concentration of between about 0.02 and about 1.0 gallons per sack of cement to increase the shear-bond between the downhole pipe and the cement plug.

2. The method of claim 1, wherein said expansive agent is a metallic oxide.

3. The method of claim 2, wherein said expansive agent is magnesium oxide.

4. The method of claim 3, wherein said expansive agent is used in concentration of from about 5 w % to about 10 w % by weight of cement.

5. The method of claim 4, wherein said expansive agent is used in concentration of about 8 w % by weight of cement.

6. The method of claim 5, wherein said latex is used at a concentration of between about 0.02 and about 0.50 gallons per sack of cement.

7. The method of claim 1, wherein said latex is styrene-butadiene latex.

8. The method of claim 7, wherein said latex is used at a concentration of between about 0.05 and about 0.20 gallons per sack of cement.

9. The method of claim 1, wherein said expansive agent comprises dissimilar materials capable of inducing a galvanic bimetallic corrosion reaction with the pipe, with the cement slurry as electrolyte.

10. The method of claim 1, wherein said cement slurry further comprises at least one additive selected from the group consisting of a dispersing agent, an anti-settling agent, a set-retarder and a set-accelerator.

11. A method of forming a cement plug in a downhole pipe comprising:
    positioning a platform in the downhole pipe below the desired cement plug interval;
    positioning a plug dump bailer tool comprising a tubular storing chamber for a cement slurry and a valve to discharge the cement slurry on and above the platform;
    discharging the cement slurry, whereby said cement slurry comprises an expansive agent and a latex in incorporated in a concentration of between about 0.02 and about 1.0 gps of cement, whereby the effective shear bond strength between the downhole pipe and the cement plug is at least 250 psi.

12. The method of claim 11, wherein the cement slurry includes about 8 w % by weight of cement of magnesium oxide as expansive agent and between 0.05 and 0.1 gps of a styrene-butadiene latex.

13. A method of forming a cement plug in a downhole pipe comprising:
    positioning a platform in the downhole pipe below the desired cement plug interval;
    positioning a plug dump bailer tool comprising a tubular storing chamber for a cement slurry and a valve to discharge the cement slurry on and above the platform;
    discharging the cement slurry, whereby said cement slurry comprises a galvanic reaction inducing admixture and a latex in quantities enough to increase the shear-bond between the downhole pipe and the cement plug.

14. The method of claim 13, further comprising a metallic oxide expansion agent.

15. The method of claim 14, wherein said metallic oxide is magnesium oxide.

16. The method of claim 13, wherein said latex is styrene-butadiene latex.

17. The method of claim 13, wherein said admixture comprises at least two dissimilar materials capable of inducing a galvanic bimetallic corrosion reaction with the pipe, with the cement slurry as electrolyte.

18. The method of claim 17, wherein said dissimilar materials are an actively cathodic metal and an actively anodic metal.

19. The method of claim 17, wherein said dissimilar materials are carbon materials and iron reagent powder.

20. The method of claim 13, wherein said cement slurry further comprises at least one additive selected from the group consisting of a dispersing agent, an anti-settling agent, a set-retarder, and a set-accelerator.

* * * * *